(12) United States Patent
Hwang (10) Patent No.: US 6,215,219 B1
(45) Date of Patent: Apr. 10, 2001

(54) BEARING SYSTEM AND SPINDLE MOTOR ASSEMBLY ADOPTING THE SAME

(75) Inventor: Tae-yeon Hwang, Yongin (KR)

(73) Assignee: Samsung Electronics Co., Ltd. (KR)

( * ) Notice: Subject to any disclaimer, the term of this patent is extended or adjusted under 35 U.S.C. 154(b) by 0 days.

(21) Appl. No.: 09/358,391

(22) Filed: Jul. 20, 1999

(30) Foreign Application Priority Data

Jul. 28, 1998 (KR) .................................................. 98-30374

(51) Int. Cl.[7] .............................. F16C 32/04; F16C 32/06
(52) U.S. Cl. ........................ 310/90.5; 310/90; 384/107; 29/898.02
(58) Field of Search ............................ 310/90.5, 90, 91; 384/110–120, 100, 107; 29/898.02

(56) References Cited

U.S. PATENT DOCUMENTS

| | | | |
|---|---|---|---|
| 3,326,610 | * | 6/1967 | Baermann . |
| 5,610,463 | * | 3/1997 | Dunfield et al. . |
| 5,722,775 | * | 3/1998 | Thijsse et al. . |
| 5,729,065 | * | 3/1998 | Fremery et al. . |
| 5,743,655 | | 4/1998 | Slavin et al. .................... 384/107 |
| 5,791,785 | * | 8/1998 | Nose et al. . |
| 5,894,181 | * | 4/1999 | Imlach . |
| 5,986,373 | * | 11/1999 | Stucker . |
| 5,997,180 | * | 12/1999 | Ishizuka et al. . |

* cited by examiner

*Primary Examiner*—Tran Nguyen
(74) *Attorney, Agent, or Firm*—Burns, Doane, Swecker & Mathis, L.L.P.

(57) ABSTRACT

A bearing system and a spindle motor assembly adopting the same are provided. The bearing system includes a lower base on which a fixed shaft is installed, a cylindrical body fit on the fixed shaft, first and second magnetic bodies installed on the upper and lower ends of the cylindrical body, respectively; a third magnetic body installed so as to face the second magnetic body on the lower end of the cylindrical body, a fourth magnetic body facing the first magnetic body on the upper end of the cylindrical body at a predetermined space, and an upper base to which the fourth magnetic body is fixed and which is fixed to the upper portion of the fixed shaft. Accordingly, a vibration source which generates vibration during rotation due to defects of ball bearing components and cumulative processing errors caused upon conventional ball bearing support is removed by axially and radially supporting the rotating body in a non-contact way, thereby achieving a super-high rotation speed and super-accurate rotation of the rotating body.

13 Claims, 12 Drawing Sheets

FIG. 8A ( c=2.0 um, 7200 rpm )

FIG. 8B ( c=1.0 um, 10000 rpm )

BEARING SYSTEM AND SPINDLE MOTOR ASSEMBLY ADOPTING THE SAME

BACKGROUND OF THE INVENTION

1. Field of the Invention

The present invention relates to a bearing system and a spindle motor assembly adopting the same, and more particularly, to a non-contact journal bearing system which compositely uses magnetic repulsion and hydrodynamic pressure, and a spindle motor assembly adopting the same.

2. Description of the Related Art

A bearing system guides and supports a rotating object.

Figure 1:
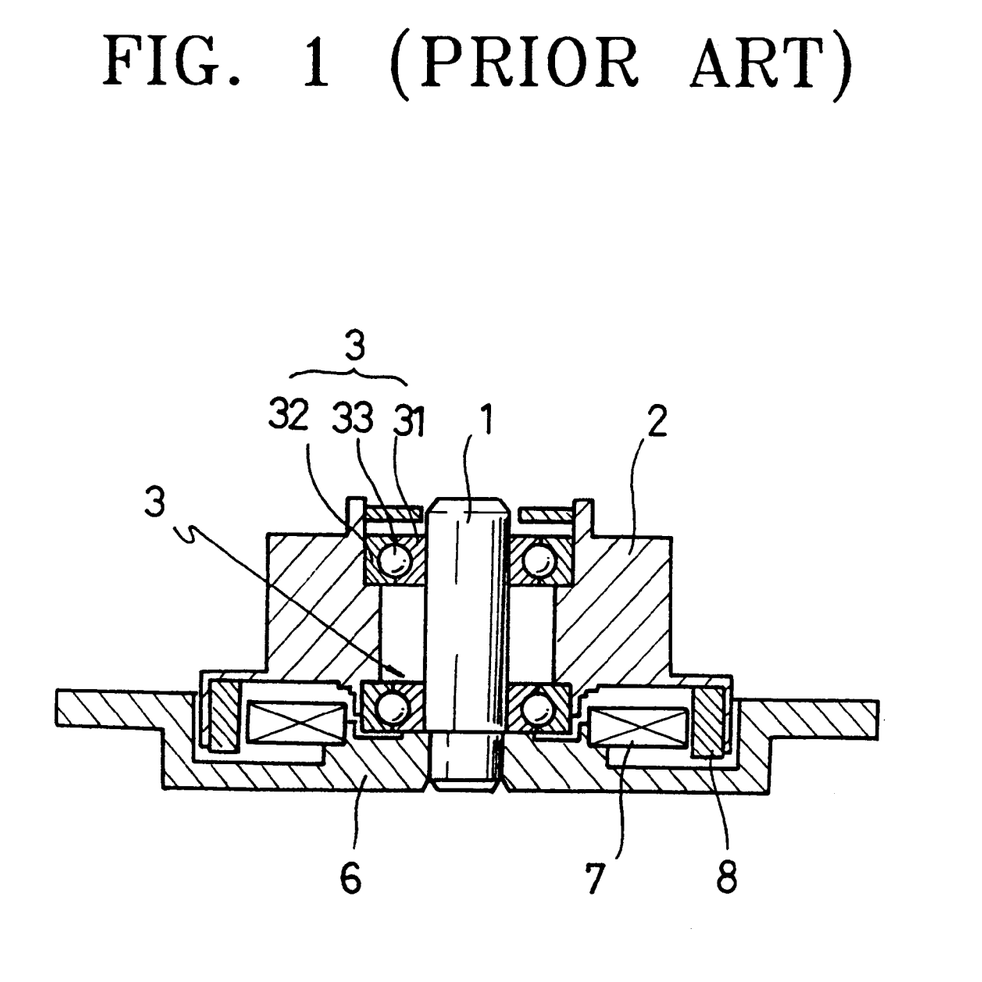
FIG. 1 is a cross-sectional view illustrating a conventional spindle motor assembly adopting a conventional bearing system.

FIG. 1 is a cross-sectional view of a motor-integrated video head drum assembly adopting a conventional bearing system.

Referring to FIG. 1, a stator 7, a component of a motor, is installed on the upper portion of a base 6 in the center of which a fixed shaft 1 with a predetermined height, another component of the motor, is installed. Typical bearings 3 are installed at the upper and lower portions of the fixed shaft 1. An inner ring 31 of the bearing 3 is pressed on and fixed to the fixed shaft 1, and an outer ring 32 thereof is pressed on and fixed to the inner circumferential surface of a rotating body 2 penetrated by the fixed shaft 1. A rotor 8, a component of the motor, facing the stator 7 is installed on the lower portion of the rotating body 2.

Figure 2:
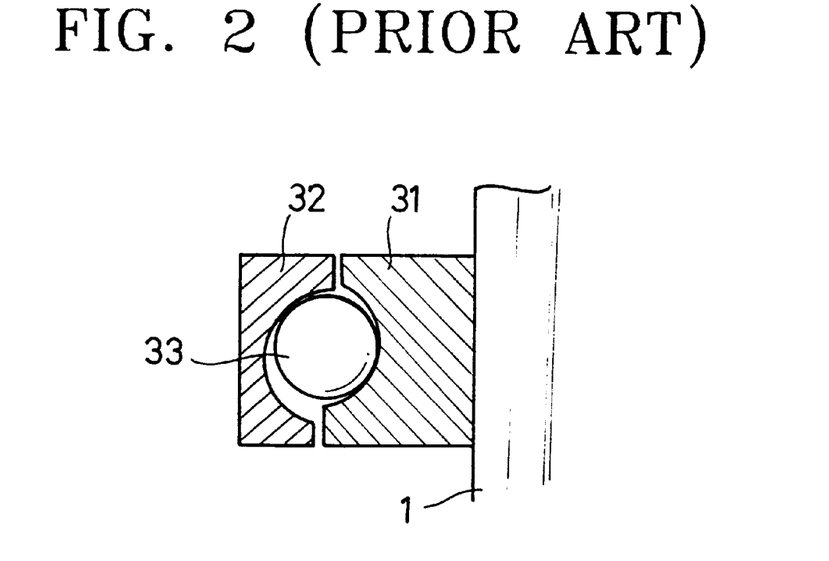
FIG. 2 is a cross-sectional view illustrating the relationship between a ball and inner and outer rings of a ball bearing in a conventional bearing system.
Figure 3:
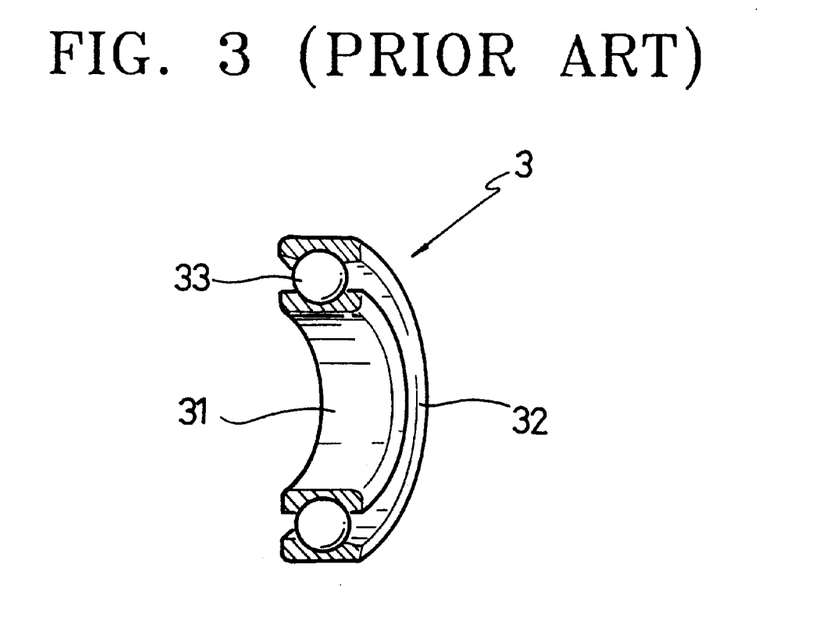
FIG. 3 is a cross-sectional view illustrating a ball bearing employed in a conventional bearing system.

In such a structure, the rotating body 2 rotates, as it is supported by the typical ball bearings 3. Each of a plurality of balls 33 of the ball bearing 3 is located in the cavity provided by two grooves with semicircular sections formed on the facing surfaces of an inner ring 31 and an outer ring 32 as shown in FIG. 2. In order to support an axial load and a load of a direction vertical to an axial direction, the ball 33 diagonally contacts the inner ring 31 and the outer ring 32 at a predetermined angle.

As described above, when the rotating body is supported by the ball bearing 3, the ball 33 and the inner and outer rings 31 and 32 contacting via the ball 33 become deformed due to mutual contact and rolling friction. Also, the rotation of the rotating body is unbalanced due to matching errors generated by processing imperfections of parts such as inner and outer rings, balls, etc. caused when the ball bearing is manufactured. Such an unbalanced rotation has been investigated and is known to cause irregular vibration due to various factors, in particular, non-repeatable run-out (NRRO). NRRO degrades the performance of a spindle motor for use in a high-density storage apparatus which requires super-accurate vibration. Even though the components of the ball bearing are manufactured by a super-accurate processing method to improve the vibration of the rotating body system, the durability of the rotating body system is deteriorated by abrasion and heat generation of the components due to friction caused by highspeed rotation. A ball bearing made of ceramic has recently been proposed, but the manufacture of the ball bearing is difficult because of the physical characteristics of ceramic, and the manufacturing cost is high.

SUMMARY OF THE INVENTION

To solve the above problems, it is an objective of the present invention to provide a magnetic-hydrodynamic pressure bearing system which is easily manufactured and can exceedingly stably support a rotating body, and a spindle motor assembly adopting the same.

It is another objective of the present invention to provide a magnetic-hydrodynamic pressure bearing system which minimizes noise by adopting elements which make relative motions to each other in a non-contact manner, and has components whose durability is greatly improved, and a spindle motor assembly adopting the same.

Accordingly, to achieve the first objective, there is provided a bearing system comprising: a lower base on which a fixed shaft having a predetermined diameter is installed; a cylindrical body having a larger inner diameter than the fixed shaft, fit on the fixed shaft; first and second magnetic bodies installed on the upper and lower ends of the cylindrical body, respectively; a third magnetic body installed on the lower circumference of the fixed shaft so as to face the second magnetic body on the lower end of the cylindrical body, the third magnetic body having magnetic repulsion against the second magnetic body; a fourth magnetic body facing the first magnetic body on the upper end of the cylindrical body at a predetermined space, the fourth magnetic body having magnetic repulsion against the first magnetic body; and an upper base to which the fourth magnetic body is fixed and which is fixed to the upper portion of the fixed shaft.

To achieve the second objective, there is provided a bearing system comprising: a fixed shaft having a predetermined diameter; a base by which the fixed shaft is supported; and a cylindrical body penetrated by the fixed shaft, wherein the inner diameter of the cylindrical body is larger than the outer diameter of the fixed shaft, the cylindrical body includes a flat portion whose core is co-aligned with the core of the fixed shaft; a tapered portion extending from the flat portion to be distant from the fixed shaft; and a groove extending from the tapered portion and formed so as to become distant from the center of the fixed shaft, and the flat portion, the tapered portion, and the groove portion are formed on the inner circumferential surface of the cylindrical body.

In the bearing system according to the present invention, the inner diameter of the cylindrical body is larger than the outer diameter of the fixed shaft, the cylindrical body includes a flat portion whose core is co-aligned with the core of the fixed shaft; a tapered portion extending from the flat portion to be distant from the fixed shaft; and a groove portion extending from the tapered portion and formed so as to become distant from the center of the fixed shaft, and a predetermined number of flat portions, tapered portions, and groove portions are formed on the inner circumferential surface of the cylindrical body, the predetermined number being the number of flat portions, tapered portions, and groove portions required for the cylindrical body to become distant from the fixed shaft.

To achieve the objectives, there is provided a spindle motor assembly comprising: a spindle having a cylindrical part formed on the center, and a rotor formed on the lower portion; a lower base which penetrates the cylindrical part of the spindle, and on which a fixed shaft having a predetermined diameter is installed, and a stator facing the rotor is installed; a cylindrical body which has a larger inner diameter than the fixed shaft, is penetrated by the fixed shaft, and is inserted and fixed to the cylindrical part of the spindle; first and second magnetic bodies installed on the upper and lower ends of the cylindrical body, respectively; a third magnetic body installed on the lower circumference of the fixed shaft so as to face the second magnetic body on the lower end of the cylindrical body, the third magnetic body having magnetic repulsion against the second magnetic body; a fourth magnetic body facing the first magnetic body on the upper end of the cylindrical body at a predetermined space, the fourth magnetic body having magnetic repulsion against the first magnetic body; and an upper base to which the fourth magnetic body is fixed and which is fixed to the upper portion of the fixed shaft.

In the bearing system and the spindle motor assembly according to the present invention, preferably, the cylindrical body is constituted of two cylindrical bodies formed up and down, and flanges are formed on the far ends of the cylindrical portions. In the spindle motor assembly, it is preferable that when the cylindrical body is divided into two cylindrical bodies each having a flange, the cylindrical part of the spindle is formed according to the shape of the outer circumferential surface of the cylindrical body and the shape of the flange installed on the cylindrical body.

BRIEF DESCRIPTION OF THE DRAWINGS

The above objectives and advantages of the present invention will become more apparent by describing in detail a preferred embodiment thereof with reference to the attached drawings in which.

DESCRIPTION OF THE PREFERRED EMBODIMENT

A bearing system according to the present invention adopts a magnetic thrust bearing and a hydrodynamic journal bearing.

Figure 4:
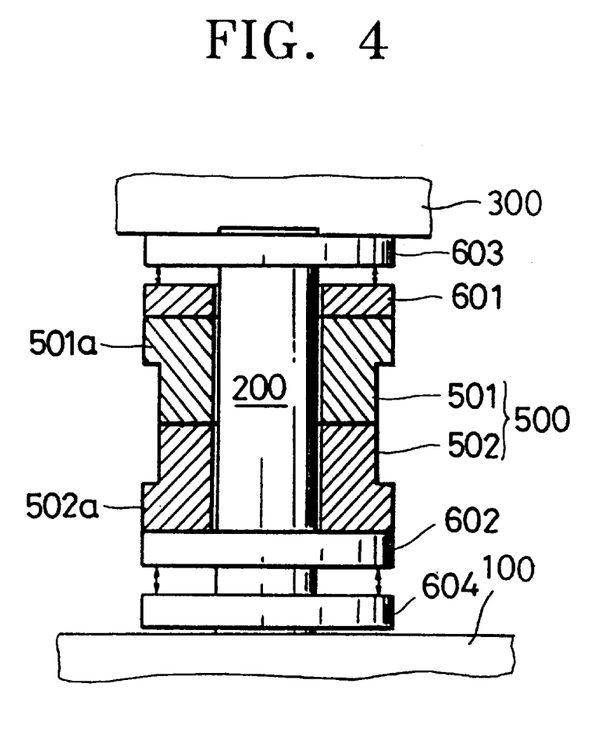
FIG. 4 is a cross-sectional view of a bearing system according to an embodiment of the present invention.

Referring to FIG. 4, a fixed shaft 200 is installed to a predetermined height on a base 100. A cylindrical body 500 fits on the fixed shaft 200. The inner diameter of the cylindrical body 500 is greater than the outer diameter of the fixed shaft 200. A hydrodynamic journal bearing is formed between the cylindrical body 500 and the fixed shaft 200. First and second ring-shaped magnetic bodies 601 and 602 are fixed on the upper and lower portions of the cylindrical body 500. An upper base 300 is installed on the upper end of the fixed shaft 200. Third and fourth magnetic bodies 603 and 604 opposite the first and second magnetic bodies 601 and 602 are installed on the lower surface of the upper base 300 and on the upper surface of the lower base 100, respectively. In this structure, the cylindrical body 500 can be formed as one body. However, it is preferable that the cylindrical body 500 is comprised of upper and lower cylindrical bodies 501 and 502 as shown in FIG. 4. Flanges 501a and 502a are formed on the respective ends of the cylindrical bodies 501 and 502 toward the upper and lower bases 300 and 100. A maximum dynamic pressure is generated from the geometrical center of the upper and lower cylindrical bodies 501 and 502, and thus the upper and lower cylindrical bodies 501 and 502 support a rotating body on which the upper and lower cylindrical bodies 501 and 502 are fit.

Figure 5:
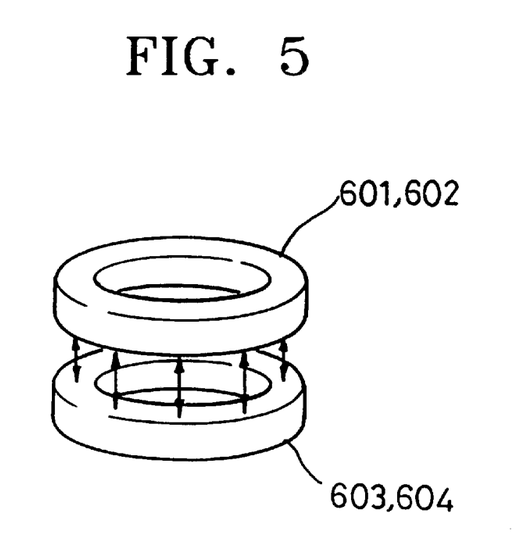
FIG. 5 is a schematic perspective view illustrating the relationship between magnetic thrust bearings in the bearing system of FIG. 4.
Figure 6:
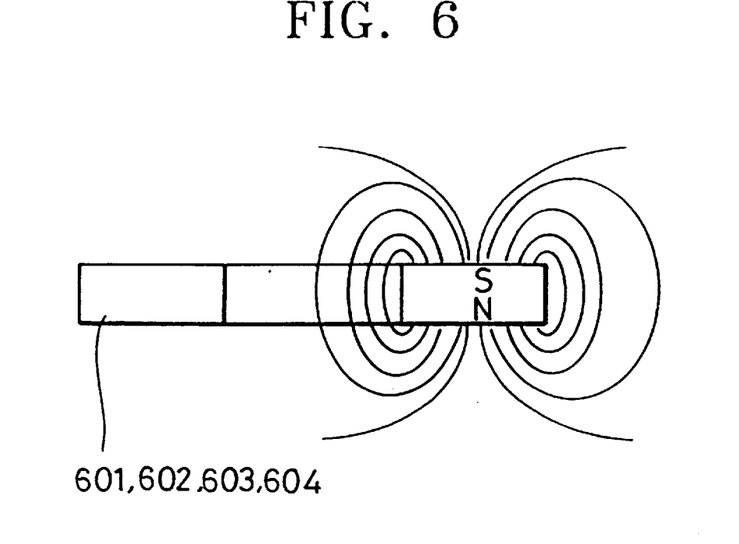
FIG. 6 is a schematic cross-sectional view illustrating the directions of magnetic force lines of a magnet of the magnetic thrust bearing in the bearing system of FIG. 4.

FIG. 5 is a perspective view showing the relationship between the magnetic bodies. The first through fourth magnetic bodies are ring-shaped as shown in FIG. 5, and axially polarized as shown in FIG. 6. Adjacent portions in the first through fourth magnetic bodies have the same magnetic poles. Mutual repulsion works between adjacent first and third magnetic bodies 601 and 603 and between second and fourth magnetic bodies 602 and 604. Thus, the cylindrical body 500 isolated between the third and fourth magnetic bodies 603 and 604 provided respectively on the inner surfaces of the upper and lower bases 300 and 100 is floating and not in contact with the first and second magnetic bodies 601 and 602 provided on the upper and lower ends of the cylindrical body 500 by such mutual repulsion. Here, the magnetic repulsion strength between magnetic bodies has a value that is proportional to the square of the approach displacement. A hydrodynamic thrust bearing as shown in U.S. Pat. No. 5,743,655 can be used instead of a thrust bearing using the magnetic body. Meanwhile, the cylindrical body 500 has an internal diameter that is larger than the outer diameter of the fixed shaft 200, such that the center of the fixed shaft 200 becomes co-axial with the center of the cylindrical body 500 by an air dynamic pressure generated upon high-speed rotation. Hence, the cylindrical body 500 and the fixed shaft 200 are completely separated from each other by an air layer.

Figure 7:
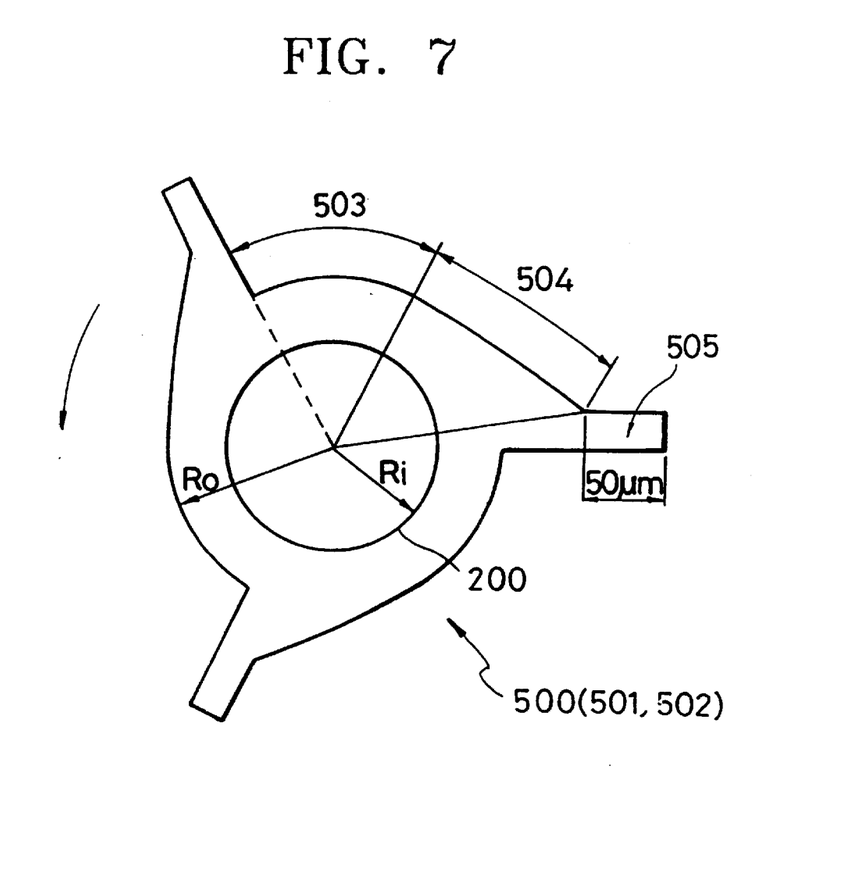
FIG. 7 is a plan view showing the internal structure of a cylindrical body (rotating body) constituting a hydrodynamic pressure bearing in a bearing system according to the present invention.

FIG. 7 is a plan view of the inner circumference shape of the cylindrical body 500 penetrated by the fixed shaft 200, which shows the case in which the cylindrical body 500 rotates counterclockwise on the fixed shaft 200.

A wedge portion providing a wedge effect to be described later is provided on the inner circumferential surface of the cylindrical body 500. The wedge portion includes an arc-typed flat portion 503, a tapered portion 504, and a groove 505 in the direction of rotation of the cylindrical body 500. The word "flat" in the "flat portion 503" means that the arc-typed surface thereof is parallel to the rotating direction of the cylindrical body 500 or the fixed shaft 200. The flat portion 503 has a center that is the same as the center of the fixed shaft 200. The tapered portion 504 linearly extends from the flat portion 503 and becomes more and more distant from the center of the shaft 200. The groove 505, having a predetermined length, extends from the tapered portion 504 and radially positioned with respect to the center of the fixed shaft 200. The wedge portion is formed around the fixed shaft in a predetermined cycle, for example, three per cycle as shown in FIG. 7.

The cycle may be determined within a range which is allowed upon processing the cylindrical body 500. As a result of manufacture of the cylindrical body 500, 3–5 cycles are suitable in practice. The flat portion 503, the tapered portion 504, and the groove 505 generate an air dynamic pressure when the cylindrical body 500 rotates, so that an air bearing is formed between the outer circumferential surface of the fixed shaft 200 and the inner circumferential surface of the cylindrical body 500. The distance from the outer circumferential surface of the cylindrical body 500 to the circular arc of the flat portion 503, i.e., a difference (hereinafter, called clearance) between the radius (Ri) of the cylindrical body 500 and the radius (Ro) of the flat portion 503, can be several pm in the range of about 2 $\mu$m. The shortest distance between the outer circumferential surface of the fixed shaft 200 and the entrance of the groove 505 is greater than the clearance, for example, 4 $\mu$m, and its length is several tens of $\mu$m, for example, 50 $\mu$m. Here, the thickness of the cylindrical body can be determined to be about 2 to 4 mm, but can vary according to a required design option. FIG. 7 shows the fixed shaft 200 having a relatively very large radius which is shrunk and the flat portion 503, the tapered portion 504 and the groove 505 which are exaggerated, in order to facilitate understanding. When the cylindrical body 500 is constituted of two cylindrical bodies 501 and 502 as described above, the flat portion 503, the tapered portion 504, and the groove 505 are formed on the inner circumferential surface of each of the cylindrical bodies 501 and 502. The cylindrical body 500 and the cylindrical bodies 501 and 502 are difficult to be manufactured by a general machining process, and thus are preferably manufactured by a compression molding method adopting powder metallurgy. A change in clearance according to the rotation of the cylindrical body is required to obtain the wedge effect of air being flowing fluid. Even when the inner portion of the cylindrical body is designed to be a genuine circle, the static eccentricity of the cylindrical body due to manufacturing error actually exists. Thus, when the cylindrical body rotates, the clearance varies. Also, when the inner circumferential surface of the cylindrical body is wavy like a wave type, a geometrical change in clearance may occur in correspondence with the windings of the outer circumferential surface of a rotating body when the static eccentricity of the cylindrical body is small. The groove 505 is used to effectively pump air. In the change in clearance formed to obtain the wedge effect of a flowing fluid, it can be recognized from interpretation of pressure distribution in a circumferential direction that pressure is reduced by an inverse wedge effect since a portion usually having a wedge effect (an area where the clearance decreases in a rotating direction) and a wedge portion (an area where the clearance increases in the rotation direction) having the inverse wedge effect are designed to always exist at the same time. The change in clearance becomes a factor of lowering the stiffness of the hydrodynamic pressure bearing. In a method using the pumping effect of the flowing fluid, when air, having a very small friction coefficient, is used as the flowing fluid, a sufficient rotating speed is required to retrieve the amount of reduced pressure due to an increase in clearance corresponding to the depth of the groove 505 for inducing the pumping effect.

Figure 8A:
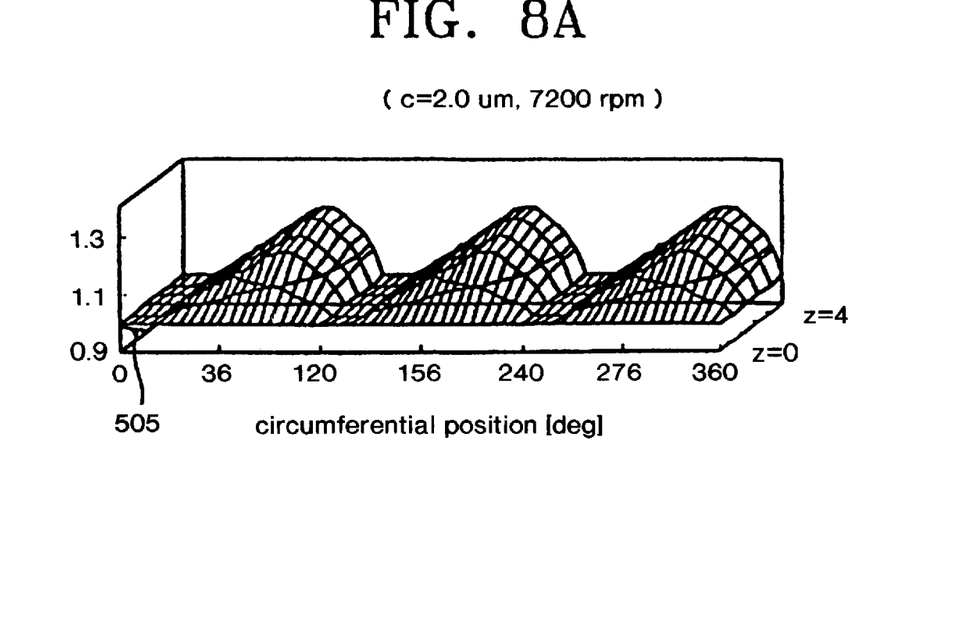
FIGS. 8A and 8B are line charts of the dimensionless radial pressure distribution generated within a cylindrical body in a bearing system of the present invention.
Figure 8B:
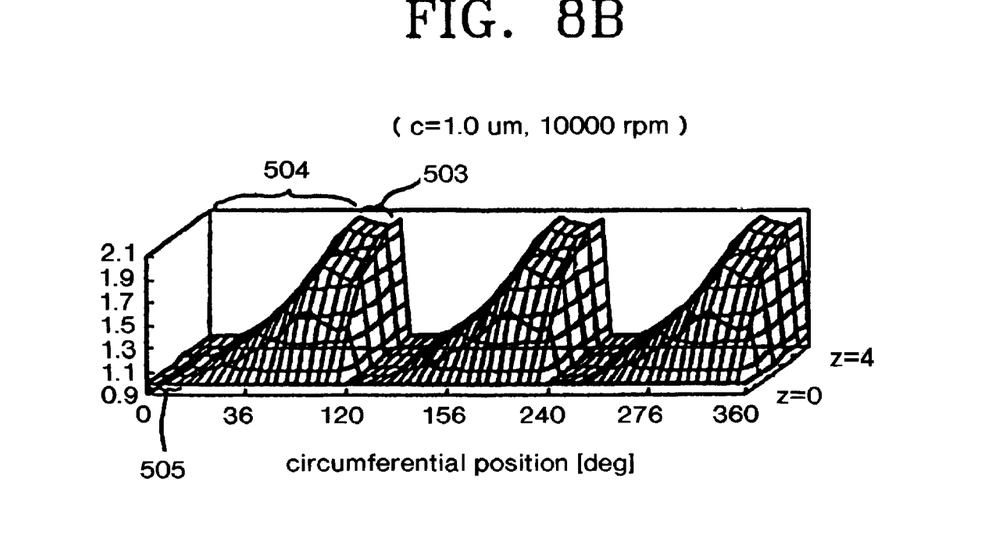

FIGS. 8A and 8B show radial dimensionless pressure distribution (a value obtained by dividing a pressure distribution value by the atmospheric pressure) generated within the cylindrical body 500 having such a structure. FIG. 8A is a pressure distribution line chart when the cylindrical body 500 rotates at 7200 RPM, and FIG. 8B is a pressure distribution line chart when the cylindrical body 500 rotates at 10000 RPM. Referring to FIGS. 8A and 8B, it can be seen that the hydrodynamic pressure due to a hydrodynamic pressure wedge effect is generated in the rotating direction of the cylindrical body, i.e., in a direction where the depth of the taper portion 504 is reduced, and that the hydrodynamic pressure is almost maintained in the flat portion 503. The pressure in the groove 505 is kept at the atmospheric pressure having a dimensionless pressure value of 1.0. Thus, it becomes evident that pressure is increased in the circumference of the fixed shaft 200 according to high-speed rotation of the cylindrical body (rotating body), which generates a radial stiffness of a bearing which resists the radial contact of the rotating body. Furthermore, in the circumference of the fixed shaft 200, several points having a maximum pressure value is generated, and the number of points is the same as the number of cycles of flat portion-taper portion-groove around the fixed shaft 200. Thus, there is provided an effect in which the rotating body is supported by the pointers. As a consequence, more stable radial directional support of the cylindrical body (rotating body) support is possible.

FIGS. 9 through 14 show the simulation results of the characteristics of a bearing system according to the present invention and those of a rotor-bearing system supported by the bearing. In FIGS. 9 through 14, the characteristics of hydrodynamic pressure bearings respectively having a spline-type groove and a wave-type (sinusoidal wave) groove formed on the inner surface of the cylindrical body are compared to the characteristics of the bearing according to the present invention.

In FIGS. 9A through 14C, "taper-flat" denotes the embodiment according to the present invention in which a flat portion, a tapered portion, and a groove portion are all provided, "groove" denotes the case in which the spline-type groove is formed lengthwise on the inner circumferential surface of the cylindrical body, and "wave" denotes the case in which the inner circumferential surface of the cylindrical body is wavy.

Figure 9A:
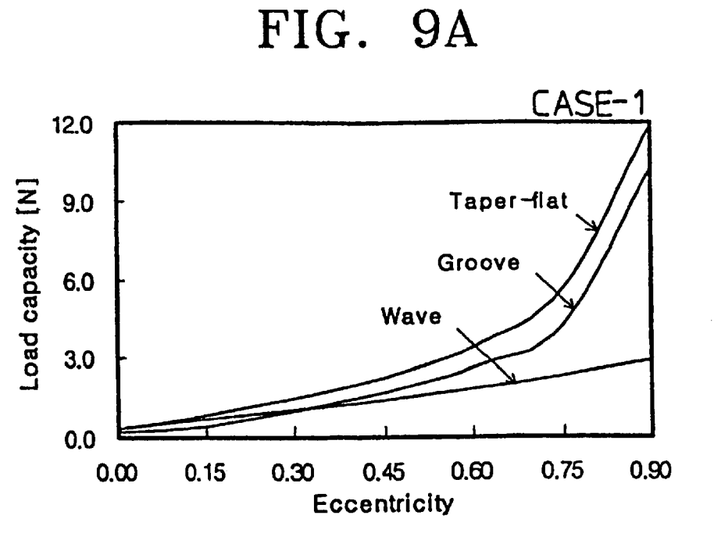
FIGS. 9A and 9B are load capacity-eccentricity variation line charts with respect to three types of bearing systems.
Figure 9B:
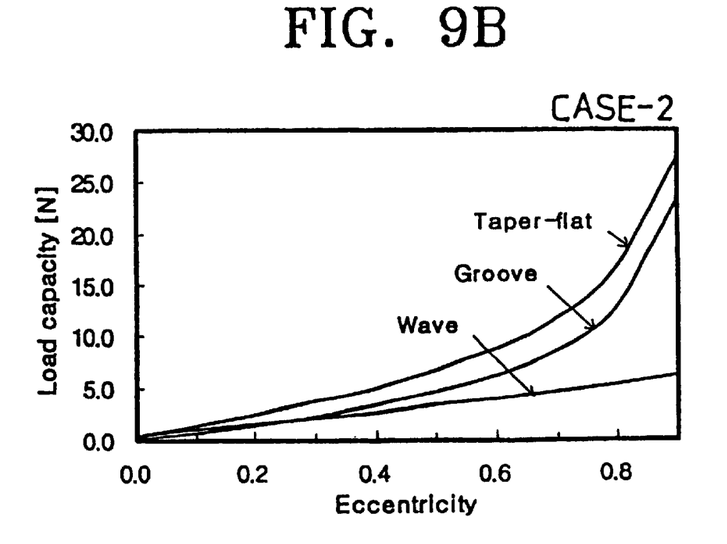

FIG. 9A is a graph showing lead capacity-eccentricity variation lines with a clearance of 2.0 $\mu$m and a rotational speed of 10000 RPM, as simulation results of CASE 1 with respect to the three types of bearing systems. FIG. 9B is a graph showing lead capacity-eccentricity variation lines with a clearance of 1.0 $\mu$m and a rotational speed of 15000 RPM, as simulation results of CASE 2 with respect to the three types of bearing systems.

Referring to FIGS. 9A and 9B, it can be seen that with a clearance of 2.0 $\mu$m, the load capacity of the bearing system according to the present invention significantly increases in an area with a static eccentricity of 0.8 or more where the rotating bodies in the three types become much closer to the fixed shaft.

Figure 10A:
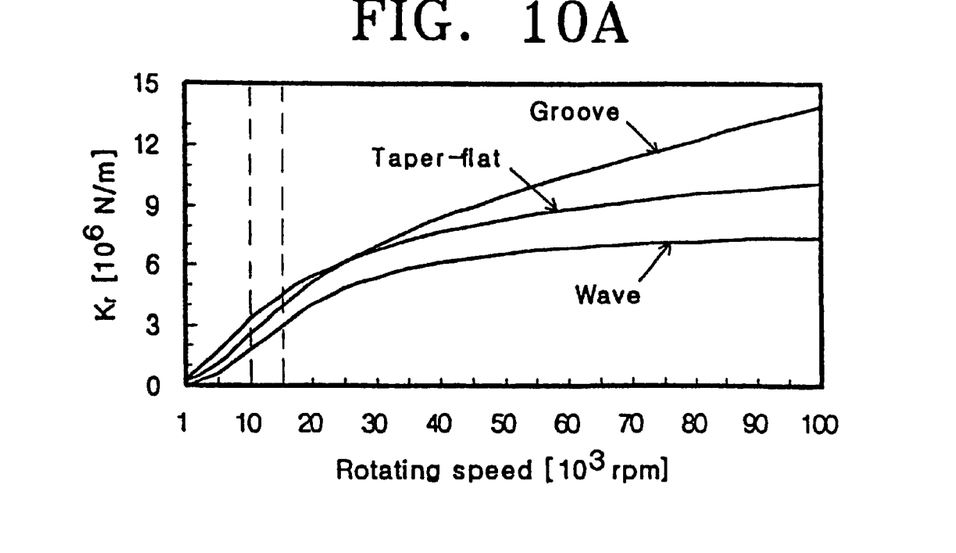
FIGS. 10A and 10B are stiffness-rotating speed variation line charts with respect to an air bearing in each of the three bearing systems according to the present invention which are compared to a different type of hydrodynamic pressure bearing, showing that the bearing system according to the present invention exhibits the highest bearing stiffness value up to a predetermined speed.
Figure 10B:
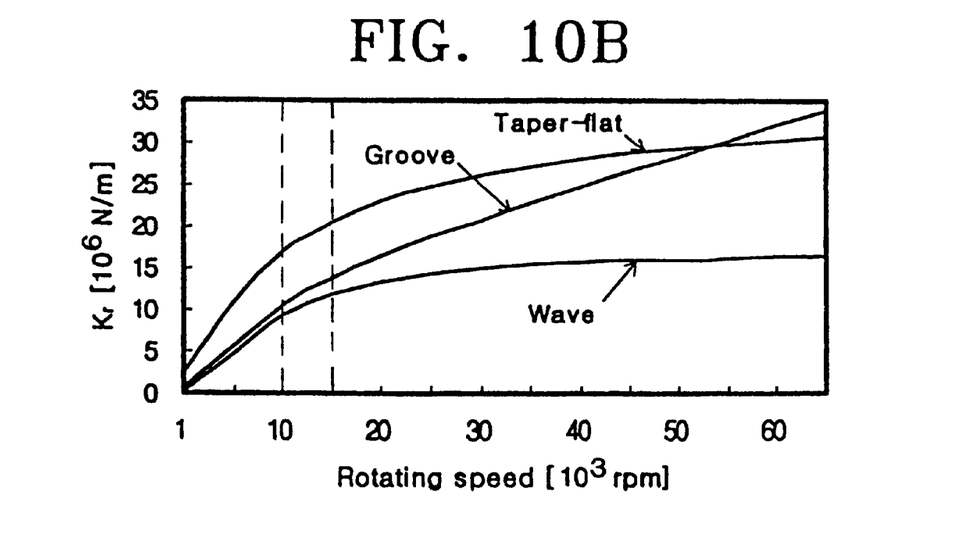

FIGS. 10A and 10B are graphs showing stiffness-rotational speed variation lines for air bearings, respectively, in two cases of a 2.0 μm clearance and a 1.0 μm clearance. Referring to FIG. 10A, when the clearance is 2.0 μm, the bearing system according to the present invention has a highest stiffness value up to the vicinity of a rotating speed of 20000 rpm, but the spline-type bearing system has the highest stiffness value at 20000 rpm or over, since a sufficient pumping effect of the flowing fluid is shown with high-speed rotation. Referring to FIG. 10B, when the clearance is 1.0 μm, the bearing system according to the present invention has the highest stiffness value up to over a rotating speed of 50000 rpm.

Figure 11A:
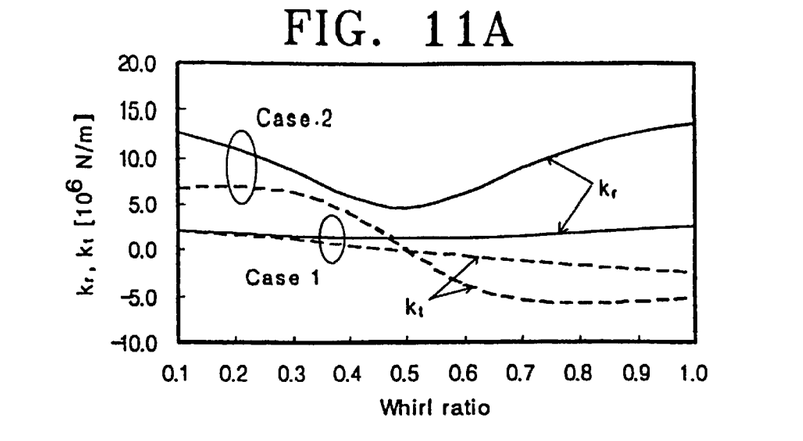
FIGS. 11A through 11C are graphs showing variations in a radial bearing stiffness value (Kr) and a tangential bearing stiffness value (Kt) with respect to the whirl ratio (excitation frequency/rotation frequency) of a rotating body.
Figure 11B:
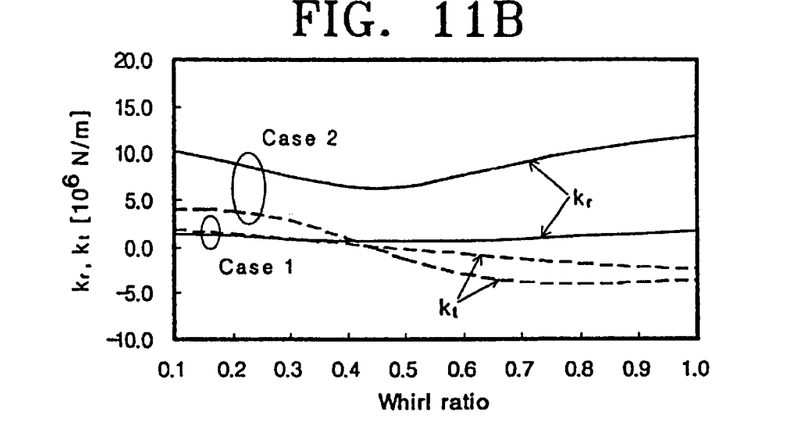
Figure 11C:
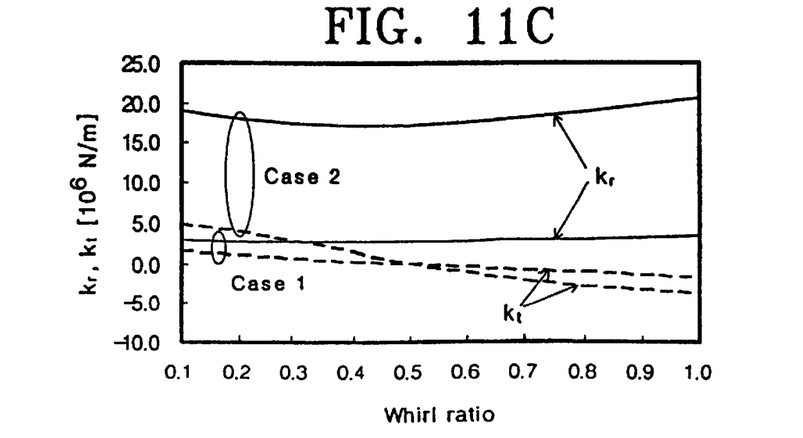

FIGS. 11A through 11C are graphs showing variations in bearing stiffness values (Kr) and (Kt) in the radial direction and the tangential direction with respect to the whirl ratio (excitation frequency/rotation frequency) of a rotating body in the Cases 1 and 2. FIG. 11A refers to the case in which the spline-type groove is formed on the inner circumferential surface of the rotating body, FIG. 11B refers to the case in which the wave-type groove is formed on the inner circumferential surface of the rotating body, and FIG. 11C refers to the embodiment according to the present invention having a flat portion, a tapered portion, and a groove portion. In a general hydrodynamic bearing, the bearing stiffness value in the radial direction is consistent with the bearing stiffness value in the tangential direction at a 0.5 whirl ratio, thus generating a half frequency whirl phenomenon which makes the support in the radial direction of the rotating body unstable. However, In the bearing system according to the present invention, there is the widest difference between the bearing stiffness values in the radial direction and in the tangential direction at a 0.5 whirl ratio, so that the rotating body is less likely to be unstable. The 1.0 whirl ratio denotes rotation at a real rotating speed in which unbalance excitation due to the unbalance of the rotating body is generated. Even in the 1.0 whirl ratio, the bearing system according to the present invention among the three different types of bearing systems can be understood to maintain the most stable rotating state since it has the widest difference between the bearing stiffness values in the radial direction and in the tangential direction.

Figure 12A:
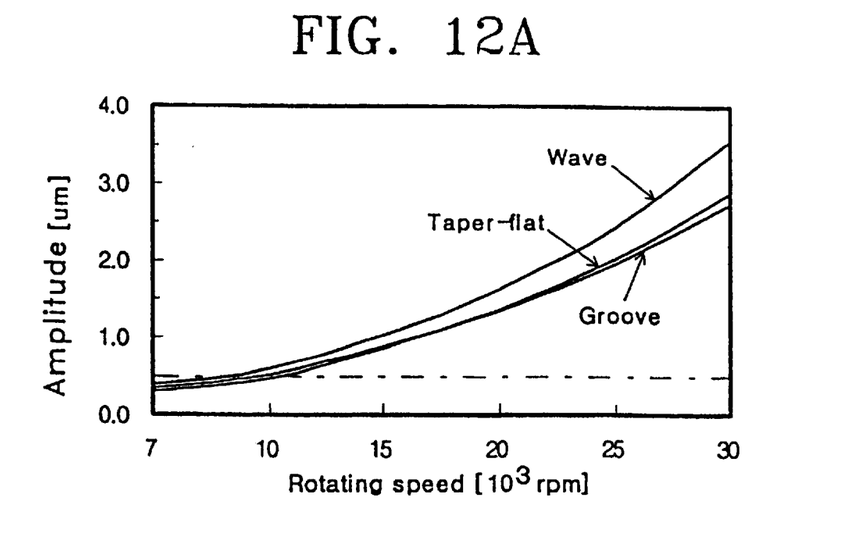
FIGS. 12A and 12B are amplitude-rotating speed variation line charts showing runout values calculated according to an unbalanced excitation with respect to the rotation speed of the rotating body.
Figure 12B:
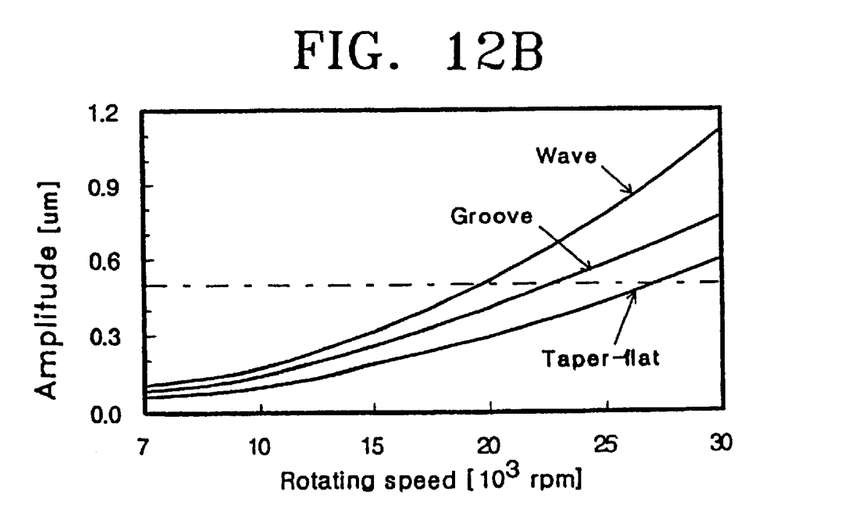

FIGS. 12A and 12B are amplitude-rotational speed variation line charts showing runout values calculated according to an unbalanced excitation with respect to the rotational speed of the rotating body. FIG. 12A refers to the case in which clearance is 2.0 μm, and FIG. 12B refers to the case in which clearance is 1.0 μm. In the case of FIG. 12A having 2.0 μm clearance, the bearing system according to the present invention shows the lowest runout value up to a rotational speed of 20000 rpm. In the case of FIG. 12B having 1.0 μm clearance, the bearing system according to the present invention shows the lowest runout value even over a rotational speed of 30000 rpm.

Figure 13A:
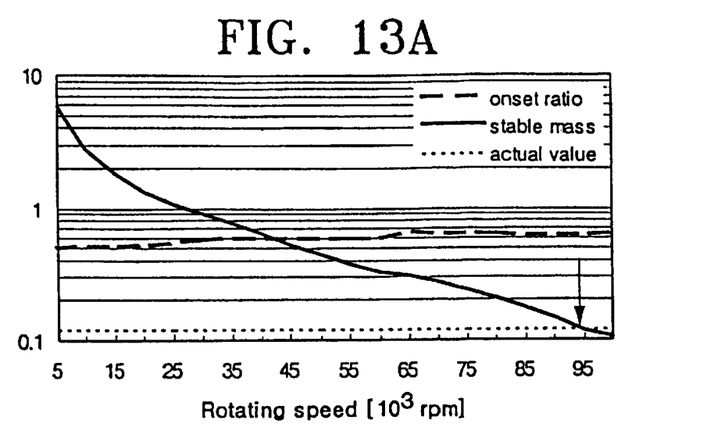
FIGS. 13A through 13C are line charts showing the results of theoretical translation for analyzing the stability and the stable allowable speed of a rotor-bearing system using an air bearing in the bearing system according to the present invention, when bearing clearance is 2 $\mu$m.
Figure 13B:
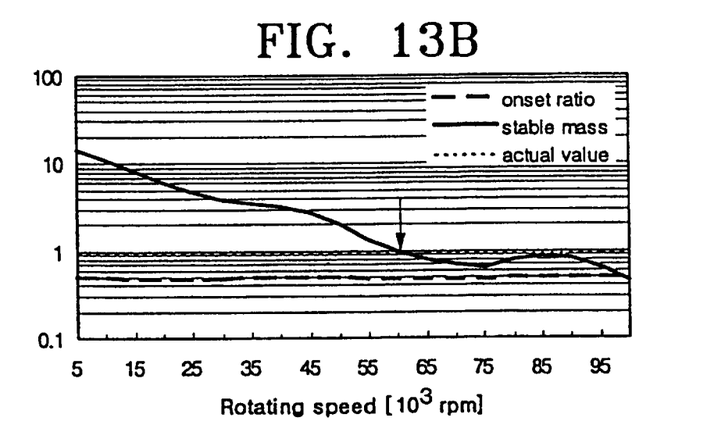
Figure 13C:
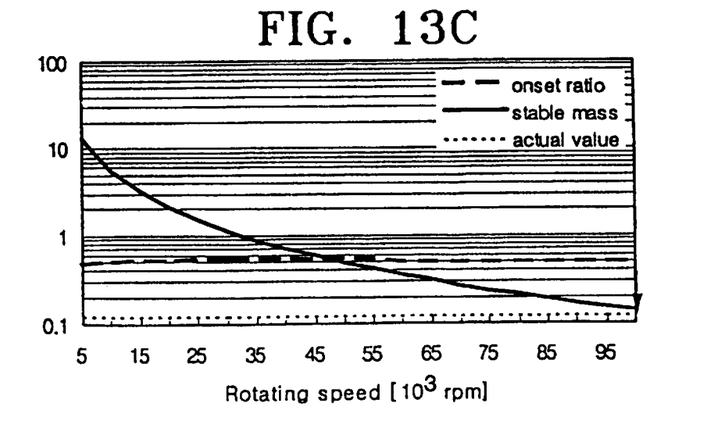

FIGS. 13A through 13C are logarithmic charts showing theoretical translation results for analyzing the stability and a stable allowable speed of a rotor-bearing system supported by the hydrodynamic pressure bearing, when clearance is 2.0 μm. FIG. 13A refers to the case in which the spline-type groove is formed on the inner circumferential surface of a cylindrical body, FIG. 13B refers to the case in which the wave-type groove is formed on the inner circumferential surface of a cylindrical body, and FIG. 13C refers to the embodiment according to the present invention having a flat portion, a tapered portion, and a groove portion. In FIGS. 13A through 13C, an arrow denotes an allowed critical speed. The bearing system according to the present invention has a stable allowable rotational speed of 100000 rpm or more as shown in FIG. 13C. Thus, it can be seen that the bearing system in FIG. 13C rotates stably up to the highest rotational speed compared to the other two bearing systems shown in FIGS. 13A and 13B.

Figure 14A:
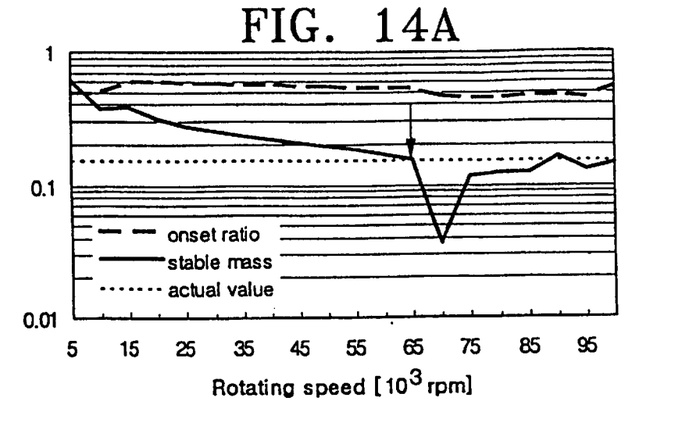
FIGS. 14A through 14C are line charts showing the results of theoretical translation for analyzing the stability and the stable allowable speed of a rotor-bearing system using an air bearing in the bearing system according to the present invention, when bearing clearance is 1 $\mu$m.
Figure 14B:
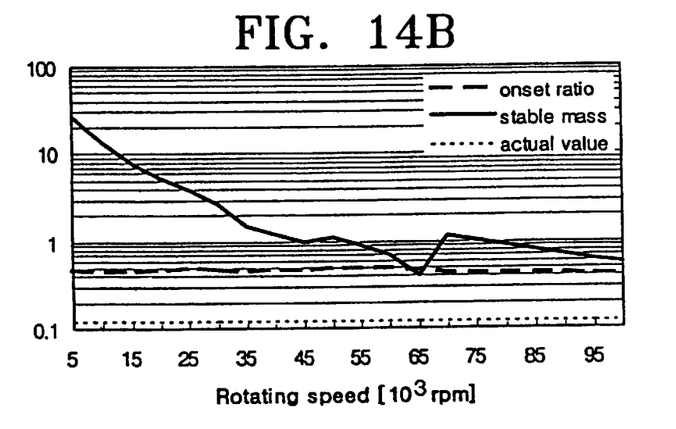
Figure 14C:
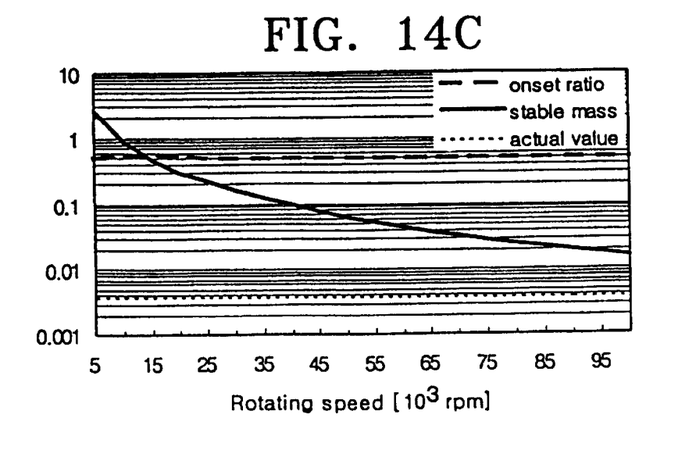

FIGS. 14A through 14C are logarithmic charts showing the results of analysis of dimensionless stability, when bearing clearance is 2.0 μm. FIG. 14A refers to the case in which the spline-type groove is formed on the inner circumferential surface of a cylindrical body, FIG. 14B refers to the case in which the wave-type groove is formed on the inner circumferential surface of a cylindrical body, and FIG. 14C refers to the embodiment according to the present invention having a flat portion, a tapered portion, and a groove portion. In FIG. 14A, an arrow denotes an allowed critical speed. FIGS. 14B and 14C with no arrows denote a critical speed of 100000 RPM or more.

Figure 15:
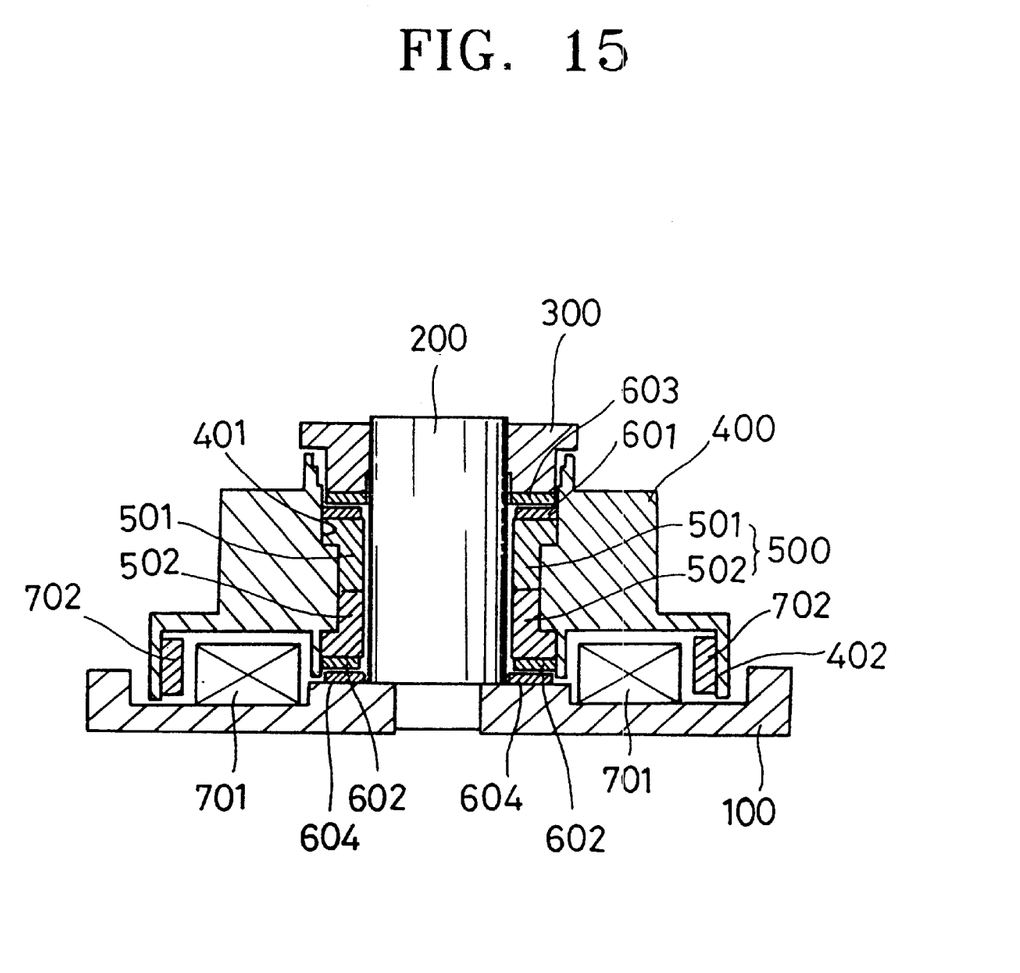
FIG. 15 is a cross-sectional view of a spindle motor assembly according to an embodiment of the present invention.

FIG. 15 is a cross-sectional view of an information recording-reproduction spindle motor assembly adopting the magnetic-hydrodynamic pressure bearing system according to the present invention.

Referring to FIG. 15, a fixed shaft 200 having a predetermined height is installed on a base 100. A cylindrical body 500 is fit on the fixed shaft 200. The cylindrical body 500 is compressively inserted into a cylindrical part 401 of a spindle motor 400. The inner diameter of the cylindrical body 500 is larger than the outer diameter of the fixed shaft 200, and a hydrodynamic pressure journal bearing is formed between the inner diameter of the cylindrical body 500 and the outer diameter of the fixed shaft 200. First and second ring-shaped magnetic bodies 601 and 602 are fixed to the upper and lower ends of the cylindrical body 500. An upper base 300 is installed on the upper edge of the fixed shaft 200. Third and fourth magnetic bodies 603 and 604 adjacent to the first and second magnetic bodies 601 and 602 are installed on the bottom surface of the upper base 300 and the top surface of the lower base 100, respectively. In this structure, the cylindrical body 500 can be formed in one body, but it is preferable that the cylindrical body 500 is constituted of upper and lower cylindrical bodies 501 and 502 as shown in FIG. 15. Flanges 501a and 502a are formed respectively on the ends of the upper and lower cylindrical bodies 501 and 502 respectively facing the upper and lower bases 300 and 100. The cylindrical part 401 of the spindle 400 is formed according to the shape of the cylindrical bodies 25 501 and 502. A skirt 402 extends from the lower part of the spindle 400, a rotor 702 constituting a motor is fixed to the inner surface of the skirt 402, and a stator 701 facing the rotor 702 is installed on the lower base 100.

As described above, the bearing system according to the present invention and the spindle motor assembly adopting the same can support a rotating body of a spindle motor axially and radially and at the same time in a non-contact system, by using magnetic axial repulsion for axial support and a hydrodynamic pressure bearing having the above-described characteristics.

The present invention removes a vibration source which generates vibration during rotation due to defects of ball bearing components and cumulative processing errors caused upon conventional ball bearing support by axially and radially supporting the rotating body in a non-contact way, thereby achieving a super-high rotation speed and super-accurate rotation of the rotating body. The bearing structure of the bearing system according to the present invention is accomplished by upward and downward axial support of the rotating body and radial support at the center of the rotating body, and can sufficiently endure a conical mode of the rotating body shown at the lowest excitation frequency shown in a spindle motor for storage apparatuses. Also, in the bearing system according to the present invention comprised of a magnetic repulsion bearing and a hydrodynamic pressure journal bearing, the initial friction between the rotating body and the fixed shaft can be reduced since the rotating body is levitated by the magnetic force even at or below a rotating speed at which an initial hydrodynamic is pressure is generated by a hydrodynamic pressure bearing. Furthermore, in the bearing system according to the present invention, the load capacity and stiffness of a bearing can be increased as much as is desired by preventing the pressure from being reduced within the clearance.

According to the present invention, among the rotational characteristics of a super-accurate rotating body which can support the rotating body of a disk such as a high-density hard disk drive requiring super-accurate rotation, a DVD, or a polygonal mirror of a laser scanner rotating at high speed, a non-repeatable run-out (NRRO) (NRRO of 0.05 $\mu$m or less is required) and stable support of a super-high speed rotating body (a rotational speed of the rotating body of 20000 RPM or more is required) are accomplished.

What is claimed is:

1. A bearing system comprising:
   a lower base on which a fixed shaft having a predetermined diameter is installed;
   a cylindrical body having a larger inner diameter than the fixed shaft, fit around but unconnected to the fixed shaft;
   first and second magnetic bodies installed on the upper and lower ends of the cylindrical body, respectively;
   a third magnetic body installed on a lower portion of the fixed shaft so as to face the second magnetic body on the lower end of the cylindrical body, the third magnetic body having magnetic repulsion against the second magnetic body;
   a fourth magnetic body facing the first magnetic body on the upper end of the cylindrical body, the fourth magnetic body having magnetic repulsion against the first magnetic body; and
   an upper base to which the fourth magnetic body is fixed and which is fixed to the upper portion of the fixed shaft.

2. The bearing system as claimed in claim 1, wherein a predetermined number of wedge portions are formed on the inner circumferential surface of the cylindrical body, the predetermined number being the number of wedge portions required for the cylindrical body to become distant from the fixed shaft.

3. A bearing system comprising:
   a lower base on which a fixed shaft having a predetermined diameter is installed;
   a cylindrical body having a larger inner diameter than the fixed shaft, fit on the fixed shaft;
   first and second magnetic bodies installed on the upper and lower ends of the cylindrical body, respectively;
   a third magnetic body installed on a lower portion of the fixed shaft so as to face the second magnetic body on the lower end of the cylindrical body, the third magnetic body having magnetic repulsion against the second magnetic body;
   a fourth magnetic body facing the first magnetic body on the upper end of the cylindrical body, the fourth magnetic body having magnetic repulsion against the first magnetic body; and
   an upper base to which the fourth magnetic body is fixed and which is fixed to the upper portion of the fixed shaft, wherein a predetermined number of wedge portions are formed on the inner circumferential surface of the cylindrical body, the predetermined number being the number of wedge portions required for the cylindrical body to become distant from the fixed shaft, and
   wherein the wedge portion includes:
      an arc-typed flat portion having the same core as the core of the fixed shaft;
      a tapered portion extending from the flat part to be distant from the fixed shaft; and
      a groove portion extending from the tapered portion and formed so as to become distant from the center of the fixed shaft.

4. The bearing system as claimed in claim 2, wherein the cylindrical body is constituted of two cylindrical bodies, a maximum dynamic pressure is generated from the geometrical center of each of the upper and lower cylindrical bodies, and the rotating body is supported by the upper and lower cylindrical bodies.

5. The bearing system as claimed in claim 1, wherein the cylindrical body is constituted of two cylindrical bodies, a maximum dynamic pressure is generated from the geometrical center of each of the upper and lower cylindrical bodies, and the rotating body is supported by the upper and lower cylindrical bodies.

6. A bearing system comprising:
   a fixed shaft having a predetermined diameter;
   a base by which the fixed shaft is supported; and
   a cylindrical body penetrated by the fixed shaft,
   wherein the inner diameter of the cylindrical body is larger than the outer diameter of the fixed shaft, the cylindrical body includes a flat portion whose core is co-aligned with the core of the fixed shaft; a tapered portion extending from the flat portion to be distant from the fixed shaft; and a groove extending from the tapered portion and formed so as to become distant from the center of the fixed shaft, and the flat portion, the tapered portion, and the groove portion are formed on the inner circumferential surface of the cylindrical body.

7. The bearing system as claimed in claim 6, wherein the cylindrical body is constituted of two cylindrical bodies.

8. A spindle motor assembly comprising:
   a spindle having a cylindrical part formed on a center of the spindle, and a rotor formed on a lower portion of the spindle;
   a lower base which penetrates the cylindrical part of the spindle, and on which a fixed shaft having a predetermined diameter is installed, and on which a stator facing the rotor is installed;
   a cylindrical body having a larger inner diameter than the fixed shaft, the fixed shaft penetrating the cylindrical body, the cylindrical body being disposed in and fixed to the cylindrical part of the spindle, the spindle and the cylindrical body fitting around and being unconnected to the fixed shaft;
   first and second magnetic bodies installed on upper and lower ends of the cylindrical body, respectively;

a third magnetic body installed on a lower circumference of the fixed shaft so as to face the second magnetic body on the lower end of the cylindrical body, the third magnetic body having magnetic repulsion against the second magnetic body;

a fourth magnetic body facing the first magnetic body on the upper end of the cylindrical body, the fourth magnetic body having magnetic repulsion against the first magnetic body; and an upper base to which the fourth magnetic body is fixed and which is fixed to the upper portion of the fixed shaft.

9. A spindle motor assembly comprising:

a spindle having a cylindrical part formed on a center of the spindle, and a rotor formed on a lower portion of the spindle;

a lower base which penetrates the cylindrical part of the spindle, and on which a fixed shaft having a predetermined diameter is installed, and on which a stator facing the rotor is installed;

a cylindrical body having a larger inner diameter than the fixed shaft, the fixed shaft penetrating the cylindrical body, and being disposed in and fixed to the cylindrical part of the spindle;

first and second magnetic bodies installed on upper and lower ends of the cylindrical body, respectively;

a third magnetic body installed on a lower circumference of the fixed shaft so as to face the second magnetic body on the lower end of the cylindrical body, the third magnetic body having magnetic repulsion against the second magnetic body;

a fourth magnetic body facing the first magnetic body on the upper end of the cylindrical body, the fourth magnetic body having magnetic repulsion against the first magnetic body; and an upper base to which the fourth magnetic body is fixed and which is fixed to the upper portion of the fixed shaft, wherein the inner diameter of the cylindrical body is larger than the outer diameter of the fixed shaft, the cylindrical body includes a flat portion whose core is co-aligned with the core of the fixed shaft; a tapered portion extending from the flat portion to be distant from the fixed shaft; and a groove portion extending from the tapered portion and formed so as to become distant from the center of the fixed shaft, and a predetermined number of flat portions, tapered portions, and groove portions are formed on the inner circumferential surface of the cylindrical body, the predetermined number being the number of flat portions, tapered portions, and groove portions required for the cylindrical body to become distant from the fixed shaft.

10. The spindle motor assembly as claimed in claim 9, wherein the cylindrical body is constituted of two cylindrical bodies.

11. The spindle motor assembly as claimed in claim 8, wherein the cylindrical body is constituted of two cylindrical bodies.

12. A spindle motor assembly comprising:

a spindle having a cylindrical part formed on a center of the spindle, and a rotor formed on a lower portion of the spindle;

a lower base which penetrates the cylindrical part of the spindle, and on which a fixed shaft having a predetermined diameter is installed, and on which a stator facing the rotor is installed;

a cylindrical body having a larger inner diameter than the fixed shaft, the fixed shaft penetrating the cylindrical body, the cylindrical body being disposed in and fixed to the cylindrical part of the spindle, the spindle and the cylindrical body fitting around and being unconnected to the fixed shaft;

first and second magnetic bodies installed on upper and lower ends of the cylindrical body, respectively;

a third magnetic body installed on a lower portion of the fixed shaft so as to face the second magnetic body on the lower end of the cylindrical body, the third magnetic body having magnetic repulsion against the second magnetic body;

a fourth magnetic body facing the first magnetic body on the upper end of the cylindrical body, the fourth magnetic body having magnetic repulsion against the first magnetic body; and an upper base to which the fourth magnetic body is fixed and which is fixed to the upper portion of the fixed shaft, wherein flanges are formed on far ends of the cylindrical portions, and the cylindrical part of the spindle is formed according to a shape of the outer circumferential surface of the cylindrical body and a shape of the flange installed on the cylindrical body.

13. A spindle motor assembly comprising:

a spindle having a cylindrical part formed on a center of the spindle, and a rotor formed on a lower portion of the spindle;

a lower base which penetrates the cylindrical part of the spindle, and on which a fixed shaft having a predetermined diameter is installed, and a stator facing the rotor is installed;

an upper base fixed to the upper part of the fixed shaft; and a cylindrical body which has a larger inner diameter than an outer diameter of the fixed shaft disposed in and fixed to the cylindrical part of the spindle, the cylindrical body being penetrated by the fixed shaft, wherein the cylindrical body includes a flat portion having a same core as a core of the fixed shaft, a tapered portion extending from the flat portion to be distant from the fixed shaft, and a groove extending from the tapered portion and formed so as to become distant from the center of the fixed shaft, and the flat portion, the tapered portion, and the groove portion being formed on an inner circumferential surface of the cylindrical body.

* * * * *